United States Patent
Durrant et al.

(10) Patent No.: US 7,457,316 B1
(45) Date of Patent: Nov. 25, 2008

(54) METHOD AND SYSTEM FOR HANDLING RECEIVED PACKETS

(75) Inventors: Paul Durrant, Slough (GB); Yuzo Watanabe, San Francisco, CA (US); Nicolas G. Droux, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 779 days.

(21) Appl. No.: 10/930,299

(22) Filed: Aug. 31, 2004

(51) Int. Cl.
*H04J 3/24* (2006.01)
(52) U.S. Cl. .................. 370/473; 370/389; 370/392; 370/393; 370/401
(58) Field of Classification Search .......... 370/473, 370/401, 392, 256, 393, 389
See application file for complete search history.

(56) References Cited

U.S. PATENT DOCUMENTS

| | | | | |
|---|---|---|---|---|
| 6,704,311 B1 * | 3/2004 | Chuah et al. | | 370/389 |
| 6,937,576 B1 * | 8/2005 | Di Benedetto et al. | | 370/256 |
| 6,963,568 B2 * | 11/2005 | Rajan | | 370/392 |
| 6,975,581 B1 * | 12/2005 | Medina et al. | | 370/401 |
| 7,170,893 B2 * | 1/2007 | Rajan et al. | | 370/393 |
| 2004/0252721 A1 * | 12/2004 | Lingafelt et al. | | 370/473 |

* cited by examiner

*Primary Examiner*—Chi H. Pham
*Assistant Examiner*—Albert T. Chou
(74) *Attorney, Agent, or Firm*—Osha Liang LLP

(57) ABSTRACT

A method for processing a chain of packets involving obtaining the chain of packets from a network, obtaining destination information from a first packet in the chain of packets, determining whether destination information of the first packet matches destination information of a second packet in the chain of packets, aggregating the first packet and the second packet to obtain an aggregated chain of packets, if destination information of the second packet matches the destination information of the first packet, hashing destination information to obtain a hash value, and forwarding the aggregated chain of packets to at least one client using the hash value.

27 Claims, 4 Drawing Sheets

METHOD AND SYSTEM FOR HANDLING RECEIVED PACKETS

BACKGROUND

Network traffic is transmitted from a network, such as the Internet, to a specific receiving system (e.g., a computer system, client, etc.). Typically, network traffic is transmitted in the form of packets, where each packet includes a header and a payload. The header contains information regarding the source address, destination address, size, transport protocol used to transmit the packet, and various other identification information associated with the packet of data. The payload contains the actual data to be transmitted from the network to the receiving system.

Additionally, network traffic is transmitted through several layers of the communication protocol. One such layer is the data link layer. The data link layer is the layer responsible for organizing the raw data into a logical structure of frames (i.e., addressable units of information) via network interface cards that are fed by switches and bridges. Bridges extend the network and are capable of translating protocols between two mixed protocol networks. Switches include application-specific integrated circuits (ASICs) to route data to individual workstations. In large network systems, switches can be configured to join groups of ports on a local area network (LAN) switch to form a virtual local area network (VLAN). A VLAN effectively partitions a physical LAN into several LANs.

The data link layer typically includes the media access control (MAC). The MAC provides the physical address that is hard-coded into each network interface card (NIC). Typically, when packets are received by the MAC, the MAC examines each packet header and extracts the necessary destination information in order to determine the one or more applications, hosts, clients, processes, etc. that should receive a copy of the packet. Typically, the MAC performs some function (e.g., a hash function) to determine the mapping from the destination information to the actual destination application, host, client, process, etc. This process is repeated for each packet that is received by the MAC, regardless of whether the packets are received in a chain or going to the same destination.

SUMMARY

In general, in one aspect, the invention relates to a method for processing a chain of packets comprising obtaining the chain of packets from a network, obtaining destination information from a first packet in the chain of packets, determining whether destination information of the first packet matches destination information of a second packet in the chain of packets, aggregating the first packet and the second packet to obtain an aggregated chain of packets, if destination information of the second packet matches the destination information of the first packet, hashing destination information to obtain a hash value, and forwarding the aggregated chain of packets to at least one client using the hash value.

In general, in one aspect, the invention relates to a system, comprising a network interface card configured to receive a chain of packets, a media access control software configured to process the chain of packets, wherein functionality to process the chain of packets comprises functionality to obtain destination information from a first packet in the chain of packets, determine whether destination information of the first packet matches destination information of a second packet in the chain of packets, aggregate the first packet and the second packet to obtain an aggregated chain of packets, if destination information of the second packet matches destination information of the first packet, hash destination information to obtain a hash value, and forward the aggregated chain of packets to a client using the hash value, and the client configured to receive the aggregated chain of packets.

In general, in one aspect, the invention relates to a computer system for processing a chain of packets, comprising a processor, a memory, a storage device, and software instructions stored in the memory for enabling the computer system under control of the processor, to obtain the chain of packets from a network, obtain destination information from a first packet in the chain of packets, determine whether destination information of the first packet matches destination information of a second packet in the chain of packets, aggregate the first packet and the second packet to obtain an aggregated chain of packets, if destination information of the second packet matches the destination information of the first packet, hash destination information to obtain a hash value, and forward the aggregated chain of packets to at least one client using the hash value.

In general, in one aspect, the invention relates to a computer readable medium for processing a chain of packets, comprising software instructions to obtain the chain of packets from a network, obtain destination information from a first packet in the chain of packets, determine whether destination information of the first packet matches destination information of a second packet in the chain of packets, aggregate the first packet and the second packet to obtain an aggregated chain of packets, if destination information of the second packet matches the destination information of the first packet, hash destination information to obtain a hash value, and forward the aggregated chain of packets to at least one client using the hash value.

In general, in one aspect, the invention relates to a plurality of nodes, comprising a network interface card configured to receive a chain of packets, a media access control software configured to process the chain of packets, wherein functionality to process the chain of packets comprises functionality to obtain destination information from a first packet in the chain of packets, determine whether destination information of the first packet matches destination information of a second packet in the chain of packets, aggregate the first packet and the second packet to obtain an aggregated chain of packets, if destination information of the second packet matches destination information of the first packet, hash destination information to obtain a hash value, and forward the aggregated chain of packets to a client using the hash value, and the client configured to receive the aggregated chain of packets, wherein the network interface card resides on one of the plurality of nodes, wherein the media access control software resides on one of the plurality of nodes, and wherein the client resides on one of the plurality of nodes.

Other aspects of the invention will be apparent from the following description and the appended claims.

DETAILED DESCRIPTION

Figure 1:
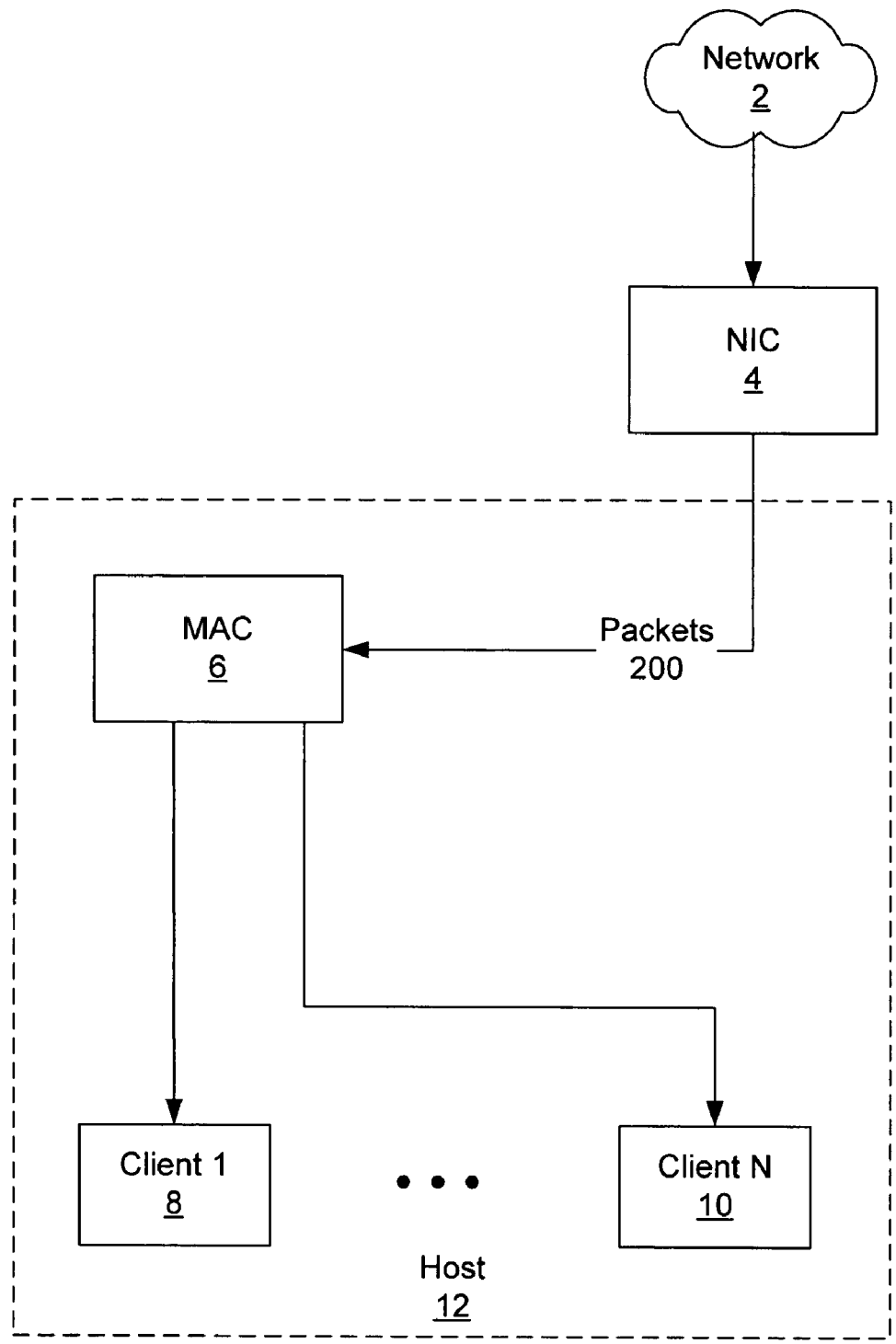
FIG. 1 shows a system for receiving packets in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to handling a chain of packets (i.e., network traffic) received by a network interface card (NIC). Specifically, one or more embodiments of the invention relate to aggregating all the packets with the same client destination based on destination information, and forwarding all the packets to the client destination during a single transfer. Further, one or more embodiments use a hashing function to look up the client destination based on destination information included in the packets.

FIG. 1 shows a system for receiving packets in accordance with one embodiment of the invention. The system may include a NIC (4), a media access control (MAC) (6), and multiple clients (i.e., Client 1 (8), Client N (10)) residing on a host (12). The NIC is a piece of hardware found in a typical computer system that includes functionality to receive network traffic. Specifically, network traffic in the form of packets (200) transmitted via a network (2) (e.g., the Internet) are received by the NIC (4). In one embodiment of the invention, the NIC (4) and the host (12) may reside in the same virtual local area network (VLAN). The VLAN is a type of computer network connected using switches. A VLAN is defined as a group of location-independent and topology-independent devices that communicate as if they are on the same physical LAN. In other words, a VLAN typically uses one or more switches and network management software to logically segment one physical LAN into different virtual LANs. Therefore, the NIC (4), the MAC (6) and the host (12) shown in FIG. 1 may all reside within the same VLAN. One skilled in the art will appreciate that VLANs may be controlled by an Open Systems Interconnection (OSI) data link layer switch. Those skilled in the art will appreciate that the present invention may also be used in a network that does not include VLANs.

Continuing with FIG. 1, packets (200) are typically forwarded from the NIC (4) to the MAC (6), where the packets (200) are processed and forwarded to the final destination (i.e., one or more clients). In one embodiment of the invention, the MAC (6) receives a chain of packets (200) (i.e., several packets may be extracted together over the network and sent to the MAC (6)). Those skilled in the art will appreciate that the MAC (6) may not receive all the packets extracted in a chain; rather, the MAC (6) may receive the packets separately over the network. Further, each packet in the chain of packets may have different destination information (discussed below). Specifically, the chain of packets is received by the MAC (6) in the form of a link list data structure, where each packet references the next packet (i.e., using a pointer) in the chain of packets. Those skilled in the art will appreciate that the chain of packets may also be transmitted using other types of data structures (e.g., arrays, trees, etc.).

In one embodiment of the invention, the MAC (6) is software that is responsible for moving packets (200) to and from the NIC (4). As noted above, the MAC (6) includes functionality to process the chain of packets and forward the chain of packets to one or more clients (e.g., Client 1 (8), Client N (10)). In one embodiment of the invention a client may be any software unit or software component that resides on a host (e.g., computer system) and that is capable of receiving packets (200) from the MAC (6). In one embodiment of the invention each client (e.g., Client 1 (8), Client N (10)) within the host (12) may be bound to a particular service access point (SAP). The SAP indicates a component of a network address which identifies the individual application (i.e., client) on a host which is sending or receiving a packet. In particular, the SAP value binds the client to a particular protocol (e.g., Ethernet). In one embodiment of the invention, the SAP value that the client is bound to indicates that the client wishes to receives packets (200) using only that protocol. Therefore, different SAP values distinguish between different clients on a host.

Figure 2:
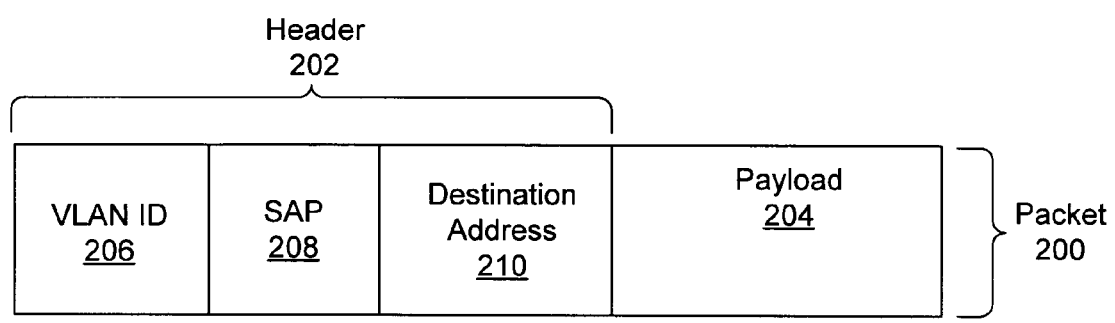
FIG. 2 shows a packet in accordance with an embodiment of the invention.

FIG. 2 shows a packet (200) in accordance with one embodiment of the invention. Typically, a packet includes a header (202) with source and destination information, and a payload (204) (i.e., message), which contains the actual data to be transmitted over the network.

As noted above, the MAC ((6) in FIG. 1) is responsible for examining packets and extracting necessary information regarding the final destination of the packet. In one embodiment of the invention, this information is included in the header (202) of the packet (200) shown in FIG. 2. More specifically, the header (202) includes a virtual local area network identifier (VLAN ID) (206), an SAP (208), and a destination address (210). In one embodiment of the invention, the VLAN ID (206) is the tag that identifies which VLAN is associated with the packet. As noted above, the SAP (208) identifies the protocol to which the destination (i.e., client) is bound. In one embodiment of the invention, the destination address (210) signifies the address of the client corresponding to the final destination of the packet (200). One skilled in the art will appreciate that the header may include other identification information in addition to the aforementioned fields of information (e.g., size of payload, source address of packet, etc).

Figure 3:
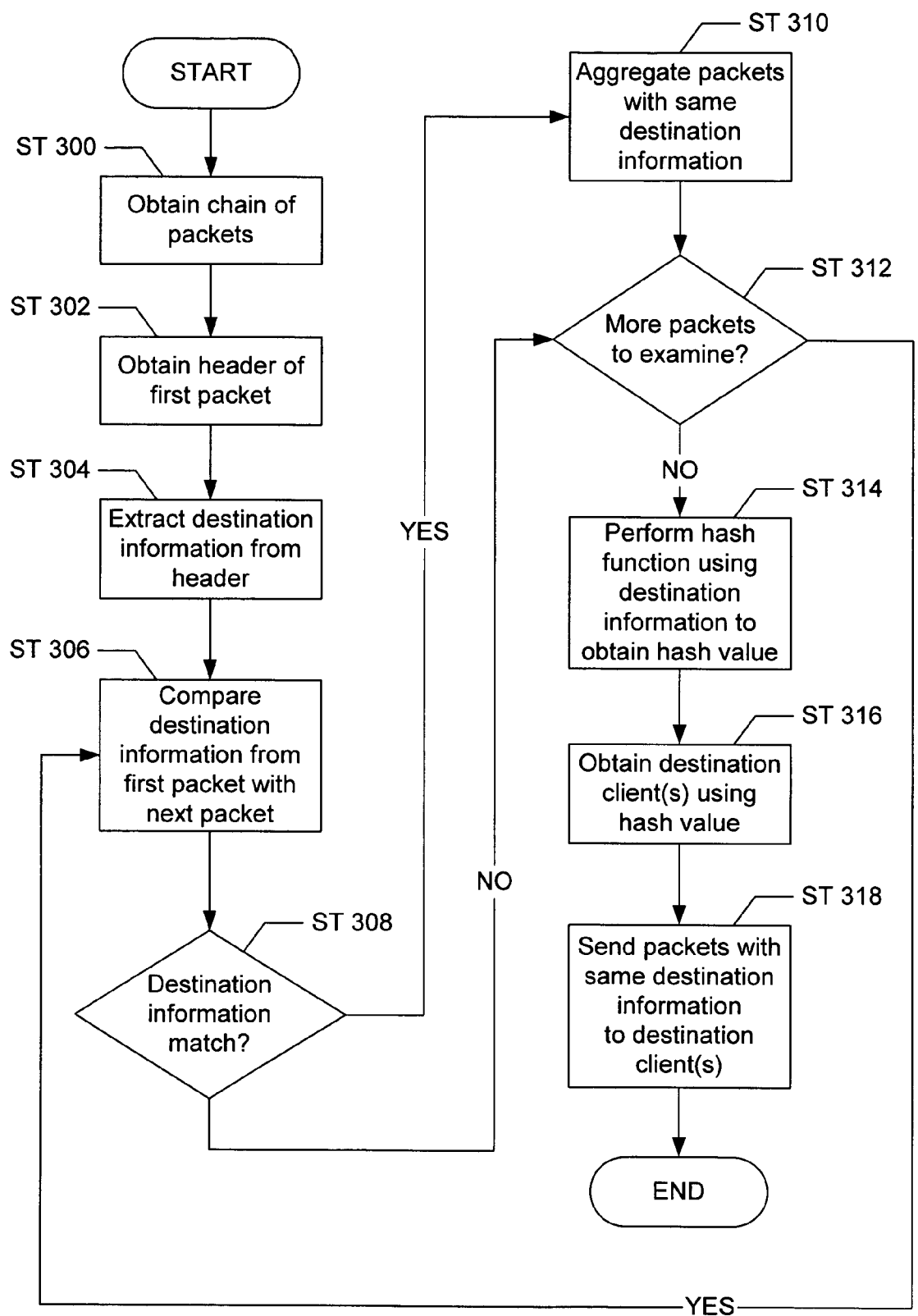
FIG. 3 shows a flow chart for handling received packets in accordance with an embodiment of the invention.

FIG. 3 shows a flow chart for processing a chain of packets in accordance with one embodiment of the invention. Initially, the chain of packets is obtained from the network (e.g., the Internet) (Step 300). In one embodiment of the invention, the chain of packets may be initially received by the NIC and then forwarded to the MAC. Further, each of the packets in the chain of packets may include different values for the VLAN ID, SAP, and destination address (i.e., all or some of the values for the aforementioned destination information may differ). Subsequently, the header of the first packet within the chain of packets is obtained by the MAC (302). The MAC then extracts destination information from the header (304). In one embodiment of the invention, the destination information includes a VLAN ID, an SAP value, and a destination address. At this stage, the destination information of the first packet is compared with the destination information of the next packet in the chain of packets (Step 306).

In one embodiment of the invention, if the destination information between the first packet and the next packet matches (i.e., the VLAN ID, SAP value, and destination address are the same in both headers) (Step 308), then the first and next packet are aggregated for the purpose of forwarding the packets to the same destination (Step 310). Alternatively, if the destination information is not the same (i.e., any one of the VLAN ID, SAP value, or destination address does not match) (Step 308), then a determination is made as to whether more packets remain in the chain of packets (Step 312). Moreover, Step 310 is performed even if the first packet and next packet have the same destination information.

If more packets exist to examine and compare to the first packet, then Steps 306-312 are repeated for each subsequent packet in the chain of packets received by the MAC. In this manner, all the packets including the same destination information are aggregated and one or more aggregated chains of packets are obtained. Upon examining the headers of each packet in the chain of packets, a hash function is performed using the destination information of each aggregated chain of packets (Step 314). As noted above, in one embodiment of the invention, each of the parameters of the destination information (i.e., the destination address, SAP, and VLAN ID) must match in the aggregated chain of packets. More specifically, in one embodiment of the invention, the hash function is performed using the VLAN ID and the SAP value as the input parameters. Subsequently, the hash look-up is performed using a table of mappings of the VLAN ID and SAP as inputs, and the address of the destination client is obtained using the hash value (Step 316).

Those skilled in the art will appreciate that the table of mappings used to obtain the client is stored in the MAC. In addition, those skilled in the art will appreciate that a particular VLAN ID and SAP combination may hash to more than one client. For example, when performing the hash function using VLAN ID 1 and SAP 1, the result obtained in the table of mappings may map to more than one client. In this case, the aggregated chain of packets may be sent to all the clients listed under that particular hash entry.

Continuing with FIG. 3, once the appropriate client is obtained for each aggregated chain of packets, the aggregated chain of packets is forwarded to the client (Step 318). Therefore, all packets with matching destination information are forwarded to an appropriate client in a single transfer. In one embodiment of the invention, the aggregated chain of packets may be forwarded as a link list or using any other type of data structure. Further, in one embodiment of the invention, before forwarding the aggregate chain of packets to the client, the MAC performs a client call using a pre-determined 'accept' function. This pre-determined 'accept' function tests the header information against the certain client criteria check whether the client is currently accepting packets for that particular destination address. In one embodiment of the invention, if the client is not currently accepting packets, then the process ends without the aggregated chain being forwarded to the client.

In one embodiment of the invention, a particular client may be in 'ALL SAP' mode. This mode indicates that all packets received by the MAC are to be forwarded to the client in 'ALL SAP' mode. In this case, after the hash function is performed using the destination information of a packet, a second hash function is performed using a reserved SAP value that is used by clients in ALL SAP mode. In one embodiment of the invention, the reserved SAP value may be an invalid SAP value that cannot be used to represent an actual SAP value that a client may be bound to. The result of the second hash function indicates which clients, if any, are in 'ALL SAP' mode. Those skilled in the art will appreciate that the same VLAN ID as the first packet examined in the chain of packets is used in conjunction with the reserved SAP value in order to perform the hash function and obtain an 'ALL SAP' mode client.

Figure 4:
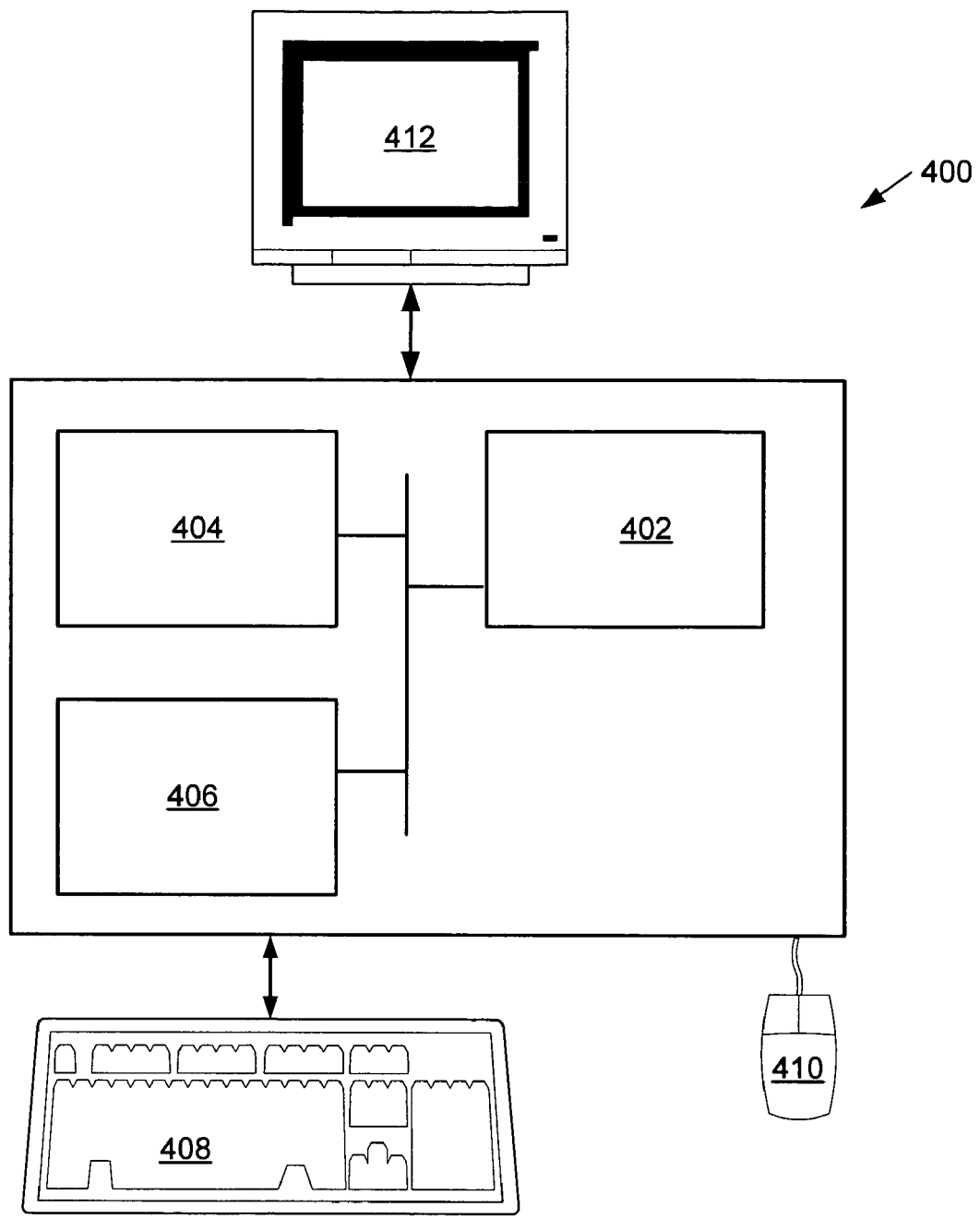
FIG. 4 shows a computer system in accordance with an embodiment of the invention.

One or more embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network via a network interface connection (not shown). Those skilled in the art will appreciate that these input and output means may take other forms.

Further, those skilled in the art will appreciate that one or more elements of the aforementioned computer (400) may be located at a remote location and connected to the other elements over a network. Further, embodiments of the invention may be implemented on a distributed system having a plurality of nodes, where each portion of the invention (i.e., NIC, MAC, host, etc.) may be located on a different node within the distributed system. In one embodiment of the invention, the node corresponds to a computer system. Further, software instructions to perform embodiments of the invention may be stored on a computer readable medium such as a compact disc (CD), a diskette, a tape, a file, or any other computer readable storage device.

Embodiments of the invention provide the ability to forward a chain of packets to clients as a unit. Additionally, embodiments of the invention allow for increased performance by efficiently handling packet reception by performing a hash function only once and forwarding several packets containing the same destination information to the client.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a chain of packets comprising:
   receiving, by a media access control (MAC) located on a host computer, the chain of packets from a network;
   obtaining, by the MAC, destination information from a first packet in the chain of packets, wherein the destination information identifies at least one application executing on the host computer;
   determining, by the MAC, whether destination information of the first packet matches destination information of a second packet in the chain of packets;
   aggregating, by the MAC, the first packet and the second packet to obtain an aggregated chain of packets, if destination information of the second packet matches the destination information of the first packet;
   hashing destination information to obtain a hash value; and
   transmitting within the host computer, the aggregated chain of packets in a single transfer to the at least one application on the host computer using the hash value, and wherein the at least one application receives the aggregated chain of packets, and
   wherein the host computer is a single physical computer.

2. The method of claim 1, further comprising:
   calculating a reserved hash value using the destination information and a reserved service access point (SAP) value; and
   forwarding the chain of packets to at least one reserved application using the reserved hash value, wherein the at least one reserved application is in ALL SAP mode, wherein an application in ALL SAP mode receives all packets received by the MAC.

3. The method of claim 1, further comprising:
determining whether the at least one application is accepting the aggregated chain of packets prior to forwarding the aggregated chain of packets.

4. The method of claim 1, wherein destination information comprises a virtual local area network identifier (VLAN ID), a SAP value, and a destination address.

5. The method of claim 1, wherein hashing the destination information to obtain a hash value comprises hashing a VLAN ID and a SAP value.

6. The method of claim 1, wherein the chain of packets is implemented as a linked list.

7. The method of claim 1, wherein the aggregated chain of packets is implemented as a linked list.

8. The method of claim 1, wherein determining whether destination information of the first packet matches the destination information of the second packet comprises comparing a first VLAN ID, a first SAP value, and a first destination address associated with the first packet with a second VLAN ID, a second SAP value, and a second destination address associated with the second packet.

9. A system, comprising:
a network interface card configured to receive a chain of packets;
a media access control software on a host computer configured to process the chain of packets, wherein the MAC software processes the chain of packets by:
obtaining destination information from a first packet in the chain of packets, wherein the destination information identifies at least one application executing on the host computer;
determining whether destination information of the first packet matches destination information of a second packet in the chain of packets,
aggregating the first packet and the second packet to obtain an aggregated chain of packets, if destination information of the second packet matches destination information of the first packet;
hashing destination information to obtain a hash value; and
transmitting within the host computer, the aggregated chain of packets in a single transfer to the application using the hash value; and
the application on the host computer configured to receive the aggregated chain of packets,
wherein the host computer is a single physical computer.

10. The system of claim 9, further comprising functionality to:
determine whether the at least one application is accepting the aggregated chain of packets prior to forwarding the aggregated chain of packets.

11. The system of claim 9, wherein destination information comprises a virtual local area network identifier (VLAN ID), a service access point (SAP) value, and a destination address.

12. The system of claim 9, wherein hashing the destination information to obtain a hash value comprises hashing a VLAN ID and a SAP value.

13. The system of claim 9, wherein the chain of packets is implemented as a linked list.

14. The system of claim 9, wherein the aggregated chain of packets comprises a linked list.

15. The system of claim 9, wherein the functionality to determine whether destination information of the first packet matches the destination information of the second packet comprises comparing a first VLAN ID, a first SAP value, and a first destination address associated with the first packet with a second VLAN ID, a second SAP value, and a second destination address associated with the second packet.

16. A computer system for processing a chain of packets, comprising:
a processor;
a memory;
a storage device; and
software instructions stored in the memory for enabling the computer system under control of the processor, to:
obtain the chain of packets from a network;
obtain destination information from a first packet in the chain of packets, wherein the destination information identifies at least one application executing on the computer;
determine whether destination information of the first packet matches destination information of a second packet in the chain of packets;
aggregate the first packet and the second packet to obtain an aggregated chain of packets, if destination information of the second packet matches the destination information of the first packet;
hash destination information to obtain a hash value; and
transmitting within the computer system the aggregated chain of packets in a single transfer to the at least one application on the computer system using the hash value, wherein the at least one application receives the aggregated chain of packets, and
wherein the computer system is a single physical computer.

17. The computer system of claim 16, wherein destination information comprises a virtual local area network identifier (VLAN ID), a SAP value, and a destination address.

18. The computer system of claim 16, wherein hashing the destination information to obtain a hash value comprises hashing a VLAN ID and a SAP value.

19. The computer system of claim 16, wherein the chain of packets is implemented as a linked list.

20. The computer system of claim 16, wherein the aggregated chain of packets is implemented as a linked list.

21. The computer system of claim 16, wherein determining whether destination information of the first packet matches the destination information of the second packet comprises comparing a first VLAN ID, a first SAP value, and a first destination address associated with the first packet with a second VLAN ID, a second SAP value, and a second destination address associated with the second packet.

22. A computer readable medium for processing a chain of packets, comprising software instructions to:
receive by a media access control (MAC) located on a host computer the chain of packets from a network;
obtain, by the MAC, destination information from a first packet in the chain of packets, wherein the destination information identifies at least one application executing on the host computer;
determine, by the MAC, whether destination information of the first packet matches destination information of a second packet in the chain of packets;
aggregate, by the MAC, the first packet and the second packet to obtain an aggregated chain of packets, if destination information of the second packet matches the destination information of the first packet;
hash destination information to obtain a hash value; and
transmitting within the host computer, the aggregated chain of packets in a single transfer to the at least one application on the host computer using the hash value, wherein the at least one application receives the aggregated chain of packets, and wherein the host computer is a single physical computer.

23. The computer readable medium of claim 22, wherein destination information comprises a virtual local area network identifier (VLAN ID), a SAP value, and a destination address.

24. The computer readable medium of claim 22, wherein hashing the destination information to obtain a hash value comprises hashing a VLAN ID and a SAP value.

25. The computer readable medium of claim 22, wherein the chain of packets is implemented as a linked list.

26. The computer readable medium of claim 22, wherein the aggregated chain of packets is implemented as a linked list.

27. The computer readable medium of claim 22, wherein determining whether destination information of the first packet matches the destination information of the second packet comprises comparing a first VLAN ID, a first SAP value, and a first destination address associated with the first packet with a second VLAN ID, a second SAP value, and a second destination address associated with the second packet.

* * * * *